US011810463B2

(12) United States Patent
Brown et al.

(10) Patent No.: US 11,810,463 B2
(45) Date of Patent: Nov. 7, 2023

(54) UNMANNED AERIAL VEHICLE CONTINGENCY LANDING SYSTEM

(71) Applicant: The Boeing Company, Chicago, IL (US)

(72) Inventors: Brandon Brown, Malvern, PA (US); David Mason, Glenmoore, PA (US); Eric Hathaway, Philadelphia, PA (US)

(73) Assignee: The Boeing Company, Arlington, VA (US)

( * ) Notice: Subject to any disclaimer, the term of this patent is extended or adjusted under 35 U.S.C. 154(b) by 291 days.

(21) Appl. No.: 16/848,159

(22) Filed: Apr. 14, 2020

(65) Prior Publication Data

US 2021/0319707 A1 Oct. 14, 2021

(51) Int. Cl.
*G08G 5/00* (2006.01)
*G05D 1/00* (2006.01)
(Continued)

(52) U.S. Cl.
CPC ......... *G08G 5/0056* (2013.01); *B64C 39/024* (2013.01); *G01S 13/913* (2013.01);
(Continued)

(58) Field of Classification Search
CPC .. G08G 5/0056; G08G 5/0039; B64C 39/024; B64C 2201/146; G01S 13/913; G05D 1/0055; G05D 1/102
See application file for complete search history.

(56) References Cited

U.S. PATENT DOCUMENTS 7,142,971 B2 11/2006 Brown et al.
7,965,202 B1 * 6/2011 Chiew .................... G01C 23/00
340/975
(Continued)

OTHER PUBLICATIONS

Enric Pastor, In-Flight Contingency Management for Unmanned Aircraft Systems, 2012, Journal of Aerospace Computing, Information, and Communication, vol. 9, No. 4, 144-160 (Year: 2012).*
(Continued)

*Primary Examiner* — Elaine Gort
*Assistant Examiner* — Anthony M Gartrelle
(74) *Attorney, Agent, or Firm* — McDonnell Boehnen Hulbert & Berghoff LLP (57) ABSTRACT

Example methods and systems for contingency landing a UAV are provided, comprising sensors configured to detect a position of the UAV and a command module. The command module receives a mission profile comprising a travel path mapped out in multidimensional space over time from an origin to a destination, a first boundary circumscribing at least a portion of the travel path, a second boundary circumscribing the first boundary, and contingent landing sites. The command module sends instructions to the UAV to fly according to the mission profile and determines a position of the UAV relative to the first and the second boundaries. Responsive to determining that the UAV is positioned at the first boundary, the command module sends instructions to land at a contingent landing site, and responsive to determining that the UAV is positioned at the second boundary, the command module sends instructions to land immediately.

20 Claims, 8 Drawing Sheets

(51) Int. Cl.
*G05D 1/10* (2006.01)
*G01S 13/91* (2006.01)
*B64C 39/02* (2023.01)

(52) U.S. Cl.
CPC .......... *G05D 1/0055* (2013.01); *G05D 1/102* (2013.01); *G08G 5/0039* (2013.01); *B64U 2201/20* (2023.01)

(56) References Cited

U.S. PATENT DOCUMENTS

| | | | |
|---|---|---|---|
| 9,412,278 B1* | 8/2016 | Gong | G08G 5/0039 |
| | | | 701/2 |
| 2004/0189492 A1* | 9/2004 | Selk, II | |
| 2015/0339931 A1* | 11/2015 | Yu | G05G 5/006 |
| 2019/0235502 A1* | 8/2019 | Lindsey | G05D 1/0202 |
| 2021/0319705 A1* | 10/2021 | Furumoto | G08G 5/0021 |

OTHER PUBLICATIONS

Timothy Patterson, Timely autonomous identification of UAV safe landing zones, 2012, Elsevier, Image and Vision Computing 32 (2014) 568-578 (Year: 2012).*

Timothy R. Jorris, Three-Dimensional Trajectory Optimization Satisfying Waypoint and No. Fly Zone Constraints, 2009, Journal of Guidance, Control, and Dynamics, vol. 32, No. 2, Mar.-Apr. 2009, 551-572 (Year: 2009).*

Brandon Call, Obstacle Avoidance for Unmanned Air Vehicles Using Image Feature Tracking, 2006, American Institute of Aeronautics and Astronautics, AIAA Guidance, Navigation, and Control Conference and Exhibit, Aug. 21-24, 2006, Keystone, Colorado, 1-9 (Year: 2006).*

* cited by examiner

UNMANNED AERIAL VEHICLE CONTINGENCY LANDING SYSTEM

FIELD

The present disclosure generally relates to systems and methods for controlled flight of an unmanned aerial vehicle (UAV), and more particularly for determining when a UAV should execute a contingency landing and directing the UAV to execute a safe contingency landing procedure.

BACKGROUND

UAVs are used for a variety of missions, such as for transportation, surveillance, and reconnaissance. Typically a UAV executes a mission by flying from a starting point to a target destination. Once launched, the UAV executes the mission flight plan autonomously or with a degree of remote operator guidance. Remote control stations can be in communication with the UAV and check the status of the flight path of the UAV as the UAV executes the mission plan.

During flight, communication or navigation signals may become blocked unexpectedly, an improvised route may be taken to avoid an environmental issue, or some other contingency may force the UAV to depart from its nominal mission plan. Should the UAV veer off course from the mission plan, the UAV could encounter air or terrain conflicts, such as dense cloud cover, other aircraft, mountainous terrain, and the like. Additionally, by flying off course from the mission plan, the UAV may exceed the high or low altitude limits for which the UAV has permission to fly. Thus, for a variety of reasons, veering off course from the mission plan may compromise the safety of the UAV.

An improved system and method capable of determining that a UAV is positioned at a boundary of a travel path and directing the UAV to execute a particular contingency landing procedure in response to detecting that the UAV is positioned at the boundary is desired.

SUMMARY

In one example, a system for contingency landing an unmanned aerial vehicle (UAV) is described. The system comprises one or more sensors configured to detect a position of the UAV and a command module. The command module comprises one or more processors configured to execute instructions stored in memory to perform functions of receiving a mission profile, the mission profile comprising a travel path mapped out in multidimensional space over time for the UAV from an origin to a destination, a first boundary circumscribing at least a portion of the travel path, a second boundary circumscribing the first boundary, and a plurality of contingent landing sites, sending instructions to the UAV to fly according to the mission profile, determining, via the one or more sensors, a position of the UAV relative to the first boundary and the second boundary, responsive to determining that the UAV is positioned at the first boundary, sending instructions to the UAV to land at one of the plurality of contingent landing sites, and responsive to determining that the UAV is positioned at the second boundary, sending instructions to the UAV to land immediately.

In another example, a method for contingency landing a UAV is provided. The method comprises executing a mission profile, the mission profile comprising a travel path for the UAV mapped out in multidimensional space over time for the UAV from an origin to a destination, a first boundary circumscribing at least a portion of the travel path, a second boundary circumscribing the first boundary, and a plurality of predetermined contingent landing sites, sending instructions to the UAV to fly according to the travel path, receiving a plurality of signals from one or more sensors indicating a position of the UAV, determining, via the plurality of signals, a position of the UAV relative to the first boundary and the second boundary, and at least one of (i) responsive to determining that the UAV is positioned at the first boundary, sending instructions to the UAV to land at one of the predetermined contingent landing sites or (ii) responsive to determining that the UAV is positioned at the second boundary, sending instructions to the UAV to land immediately In another example, a command module is provided. The command module comprises one or more processors configured to execute instructions stored in memory to perform functions of receiving a mission profile comprising a travel path for a UAV mapped out in multidimensional space over time for the UAV from an origin to a destination, a first boundary circumscribing at least a portion of the travel path, a second boundary circumscribing the first boundary, and a plurality of contingent landing sites, sending instructions to the UAV to fly according to the mission profile, determining, via signals issued from one or more sensors, a position of the UAV relative to the first boundary and the second boundary, responsive to determining that the UAV is positioned at the first boundary, sending instructions to the UAV to land at one of the plurality of contingent landing sites, and responsive to determining that the UAV is positioned at the second boundary, sending instructions to the UAV to land immediately.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples, methods, and systems are described for autonomous direction of an aircraft to a safe landing in a contingency situation. To this end, a command module is provided, which facilitates detection of a position of the UAV and provides instructions for safe landing of the UAV at a reachable landing site should the UAV veer off a predetermined travel path. Within examples, the command module is disposed on board the UAV. The command module thus provides for autonomous command and control of a UAV to an optimal landing site. Additionally, a remote control system may be present to communicate with the command module, thereby providing capability for remote control of the UAV. The systems and methods described herein allow for improved decisions to be made with respect to landing a UAV in contingent scenarios, wherein for a variety of reasons a change in position of the UAV from a predetermined flight trajectory may occur. This is achieved via a multi-layer boundary configuration, wherein successive boundaries are mapped out along a travel path and the UAV is tracked with respect to these boundaries. Should the UAV breach one or more boundaries, the UAV will responsively be instructed to execute a contingency landing procedure. The instructions issued by the command module for a boundary breach may call for more immediate landings as the UAV breaches boundaries that are further out in the successive series of boundaries.

As used herein, a contingency situation may include a situation during flight wherein an aircraft encounters one or more events that call for a prioritized landing. A contingent landing may be a prioritized landing made by an aircraft in response to less than optimal performance of the aircraft. The contingent landing may include a forced landing or a precautionary landing. A precautionary landing may result from a planned landing at a location about which information is limited, from unanticipated changes during the flight, or from abnormal situations.

Potential contingency landing sites may be determined based on terrain identified in a terrain map, taking into account surface characteristics, such as flatness, length, vegetation, unpaved or paved surfaces, and the like. The potential landing sites may also be determined based on an anticipated route or other predetermined criteria. The potential landing sites are loaded into memory for use by the control unit. The determination of which potential landing site the UAV at which should be directed to land may also factor in current aircraft performance data, to help assess which landing sites may be reached by the UAV for landing in a contingency situation.

Figure 1:
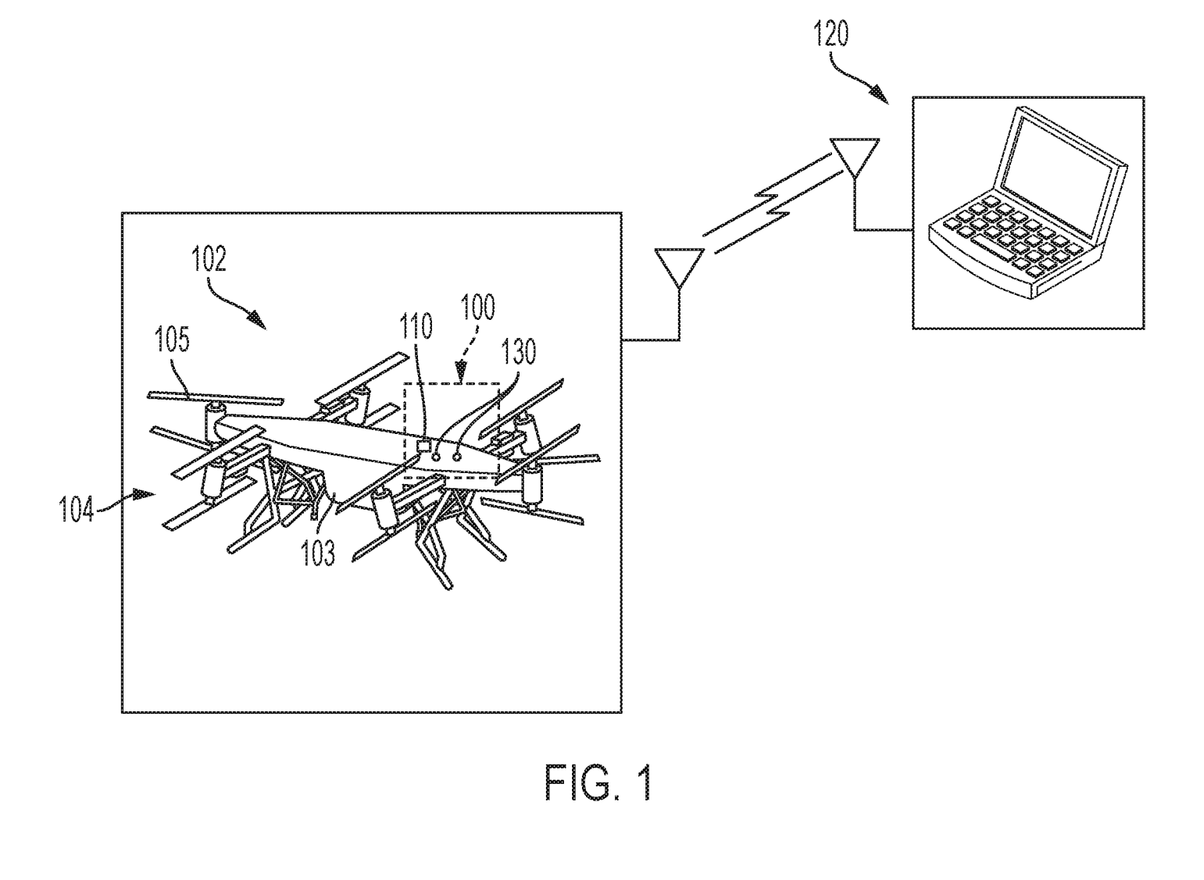
FIG. 1 illustrates a system for contingency landing a UAV, according to an example implementation.

Referring to FIG. 1, a system 100 for contingency landing a UAV 102 according to an example implementation is illustrated, comprising one or more sensors 130 configured to detect a position of the UAV 102, and a command module 110 comprising a control unit having one or more processors configured to execute instructions stored in memory to perform functions. In FIG. 1, the system 100 is disposed on UAV 100. The functions comprise receiving a mission profile, the mission profile comprising a travel path mapped out in multidimensional space over time for the UAV 102 from an origin to a destination, a first boundary circumscribing at least a portion of the travel path, a second boundary circumscribing the first boundary, and a plurality of contingent landing sites, sending instructions to the UAV 102 to fly according to the mission profile, determining, via the one or more sensors, a position of the UAV 102 relative to the first boundary and the second boundary, responsive to determining that the UAV 102 is positioned at the first boundary, sending instructions to the UAV 102 to land at one of the plurality of contingent landing sites, and responsive to determining that the UAV 102 is positioned at the second boundary, sending instructions to the UAV 102 to land immediately.

The UAV 102 includes a main housing 103 and a propulsion unit 104 mounted on the main housing 103 for propelling through an environment. The propulsion unit 104 may be an internal combustion engine, an electric battery, or a hybrid engine such as an electric-internal combustion engine. The UAV 102 further comprises one or more wing or rotor systems 105 coupled to the main housing 103 and operatively connected to the propulsion unit 104. In one example embodiment, a rotor system 105 comprising one or more propeller blades is attached to the main housing 103 via an arm extending from the housing. Within examples, the UAV 102 includes a plurality of laterally-arranged rotors. The laterally-arranged rotors may be rotor assemblies that are operatively supported by and spaced around the main housing 103 of the UAV 102. The UAV 102 may alternatively comprise wings attached to and extending from the main housing 103.

The UAV 102 may be configured to lift and transport personnel or cargo within the main housing 103, and/or may be configured to lift and transport cargo via one or more cables extending from the main housing 103.

The one or more sensors 130 may be disposed on-board the UAV 102 and may be positioned to determine and relay position information concerning the UAV 102 with respect to an environment through which the UAV 102 is traveling. Specifically, the sensors 130 may relay information concerning the position of the UAV 102 with respect to multi-layer boundaries, such as a first boundary and a second boundary, described in further detail with respect to FIGS. 3-5. The sensors 130 may include sensors useful for identifying objects and aiding in navigation, such as optical sensors (e.g., camera, infrared, RGB camera), acoustic sensors, radar sensors, and a multifunction light detection and ranging (LIDAR) system. Optical sensors may capture images nominally at a set frame capture rate. The sensors 130 may further include a rotary variable inductance transducer (RVIT) to detect an angular position of cargo relative to the UAV 102 in embodiments wherein the UAV 102 transports cargo via cables extending from the main housing 103.

The command module 110 may be disposed on-board the UAV 102 (e.g., as shown in FIG. 1), or may be remote from the UAV 102. The command module 110 comprises a control unit having one or more processors configured to execute instructions stored in memory. An example command module 110 is described with reference to FIG. 2. The UAV 102 may also include a communication interface for receiving instructions from a remote control system 120. The remote control system 120 may include computational resources such as systems for sending, receiving, and storing information. In an example, the remote control system 120 is a ground station. In an example where the command module 110 is remote from the UAV 102, the command module 110 is part of the remote control system 120 that is configured to communicate with the UAV 102.

Figure 3:
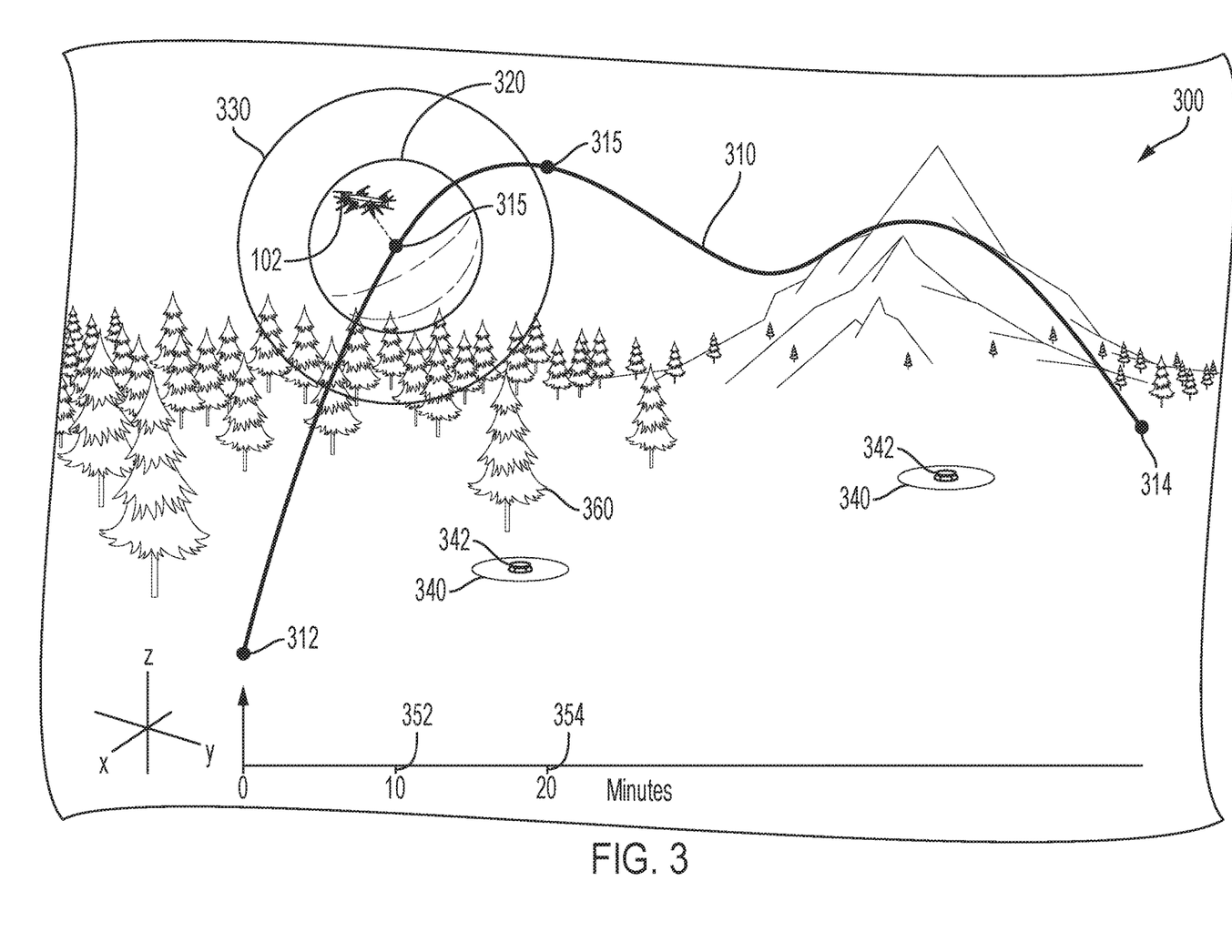
FIG. 3 illustrates a mission profile for the system of FIG. 1, according to an example implementation.
Figure 4:
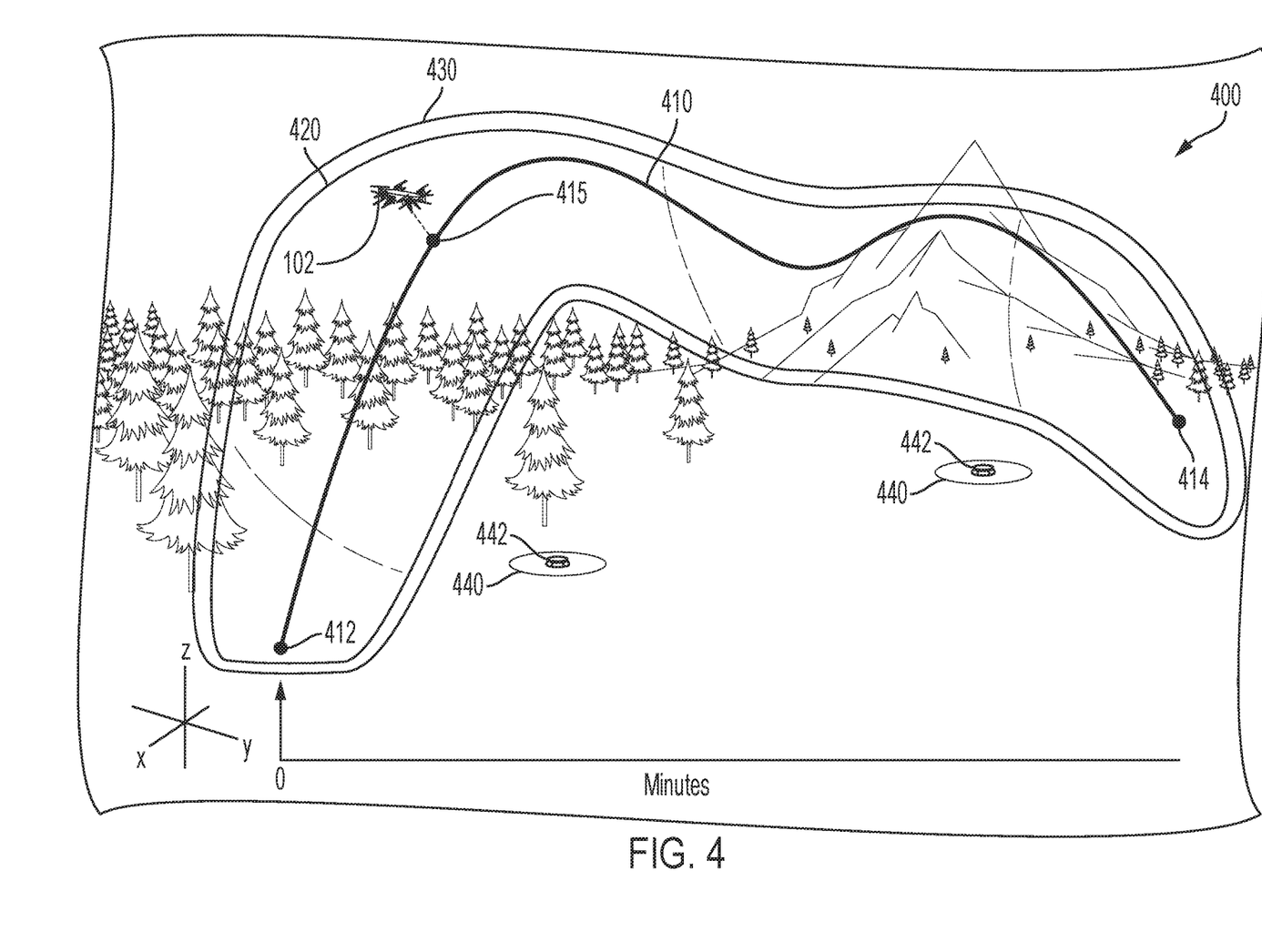
FIG. 4 illustrates a mission profile for the system of FIG. 1, according to an example implementation.
Figure 5:
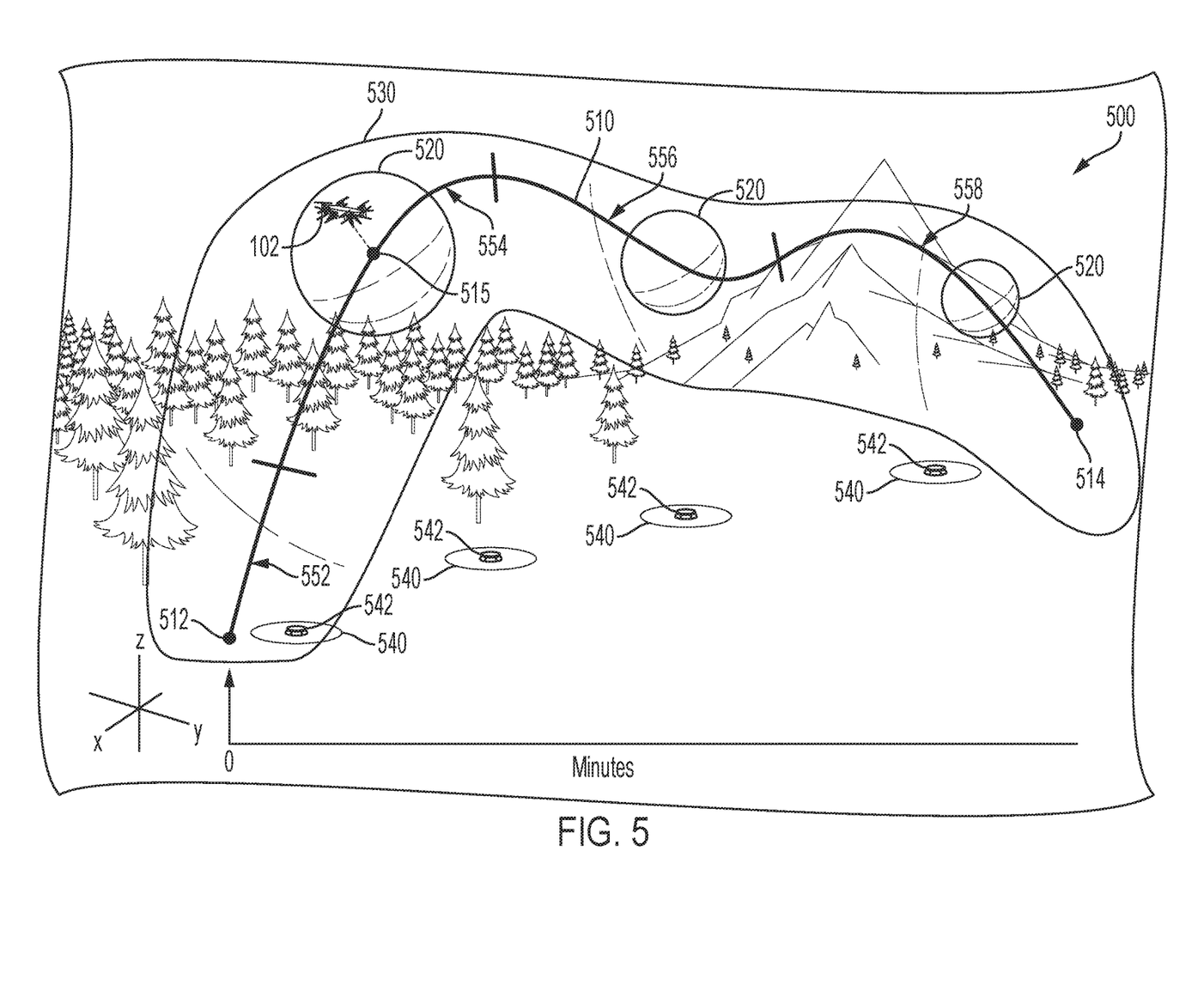
FIG. 5 illustrates an example sequence for a first boundary as the first boundary follows a UAV executing a mission profile, according to an example implementation.

The command module 110 may receive a mission profile comprising a travel path mapped out in multidimensional space over time for the UAV 102 from an origin to a destination. Example travel paths 310, 410, and 510 mapped out in multidimensional space over time for the UAV 102 are shown in FIGS. 3-5. In some examples, the UAV 102 is configured to navigate to a target location, such as the destinations 314, 414, 514 shown in FIGS. 3-5, to make a determination that the UAV 102 is hovering above the destination, and then to actuate a landing procedure. However, should the UAV 102 request or be required to land prior to reaching its planned destination, in a contingency situation, the command module 110 is configured to execute instructions to provide for such a contingency landing.

To that end, the mission profile also comprises a first boundary circumscribing at least a portion of the travel path, a second boundary circumscribing the first boundary, and a plurality of contingent landing sites that are positioned on ground along a distance of the travel path and are each associated with respective segments of the travel path. Example first and second boundaries and contingent landing sites are described in further detail with reference to FIGS. 3-5. The first or the second boundaries may each comprise a three-dimensional form that moves with reference to a desired position or is located at fixed positions in space. The command module is configured to send instructions to the UAV 102 to fly according to the mission profile, determine via the sensors 130 a position of the UAV 102 relative to the first boundary and the second boundary, and responsive to determining that the UAV 102 is positioned at the first boundary, send instructions to the UAV 102 to land at one of the plurality of contingent landing sites. Further, responsive to determining that the UAV 102 is positioned at the second boundary, the command module sends instructions to the UAV 102 to land immediately.

Within examples, the command module 110 may also, responsive to determining that the UAV 102 is positioned at the first boundary, send to the remote control system 120 a request message that requests input for executing a landing procedure. The request message may comprise an indication of a target location at which the UAV 102 is targeting to land. Within examples, the command module 110 may also, responsive to determining that the UAV 102 is positioned at the second boundary, send to the remote control system 120 a request message that requests input for executing a landing procedure. In a situation where the UAV 102 sends to the remote control system 120 a request message that requests input for executing a landing procedure, the instructions sent to the UAV 102 by the command module 110 to land at one of the plurality of contingent landing sites or to land immediately can take into account input received from the remote control system 120 (e.g., input regarding potential obstacles on a path to ground or on the ground).

In an example, sending instructions to the UAV 102 to fly according to the mission profile involves the command module sending instructions to a flight control unit of the UAV 102 to fly according to the mission profile. In an example, the flight control unit comprises the command module.

Such control allows for improved decisions to be made with respect to landing of a UAV in contingent scenarios, wherein for a variety of reasons a divergence of the UAV from a predetermined flight trajectory occurs.

Figure 2:
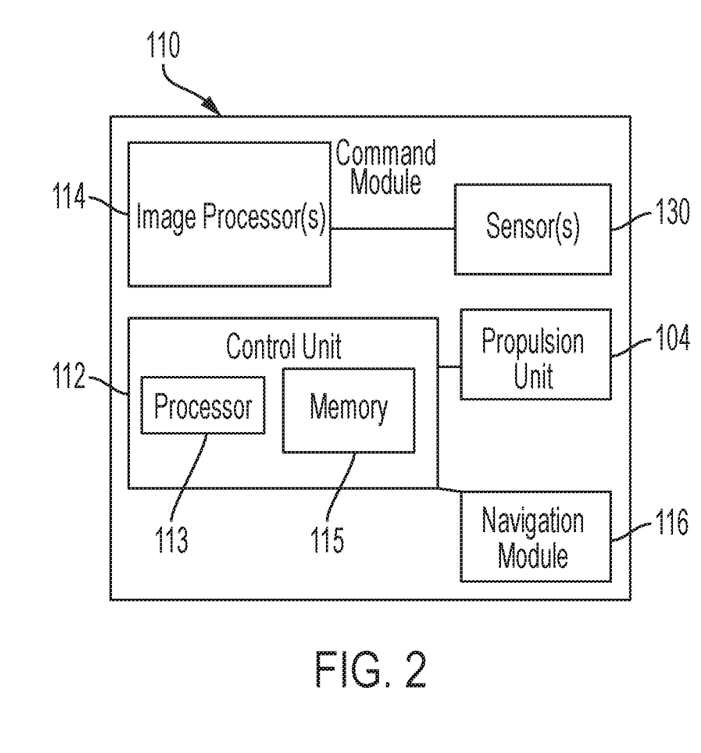
FIG. 2 illustrates a block diagram of a command module of the UAV of FIG. 1, according to an example implementation.

FIG. 2 illustrates a block diagram of a command module 110 of the UAV 102 of FIG. 1, according to an example implementation. The command module 110 includes a control unit 112, which is operatively coupled to the propulsion unit 104, a navigation module 116, the one or more sensors 130, and an image processor 114. Examples of computational resources of the command module 110 may include, but are not limited to, built-in control systems for receiving and storing information and executing instructions to control the propulsion unit 104, guidance systems to perform low-level human pilot duties such as speed and flight-path stabilization, and scripted navigation functions via the navigation module 116.

The control unit 112 controls operation of the UAV 102. As used herein, the term "control unit" may include any processor-based or microprocessor-based system including systems using microcontrollers, logic circuits, and any other circuit or processor including hardware, software, or a combination thereof capable of executing the functions described herein. For example, the control unit 112 may be or include one or more processors 113 that are configured to control operation of the UAV 102.

The control unit 112, for example, is configured to execute a set of instructions that are stored in one or more storage elements or memory 115 in order to process data. The memory 115 may be in the form of an information source or a physical memory element. The set of instructions may include various commands that instruct the control unit 112 to perform specific operations such as the methods and processes of the various examples of the subject matter described herein. The set of instructions may be in the form of a software program. Software may be stored on a tangible and non-transitory computer readable storage medium, such as a computer hard drive, ROM, RAM, or the like.

FIG. 3 illustrates a mission profile 300 for the system of FIG. 1, according to an example implementation. The mission profile 300 may be generated by a user or calculated by a computing device. The mission profile 300, once generated, may be sent to a command module, such as the command module 110 of FIG. 1.

The mission profile 300 defines a travel path 310 extending from a point of origin 312 to a destination 314, and is mapped out in multidimensional space over time. The travel path 310 thus defines a predetermined route for the UAV 102 to fly in multidimensional space over time. In FIG. 3, the travel path 310 may be set forth in three-dimensional space over minutes. A desired position 315 along the travel path 310 is shown. The travel path 310 is defined such that particular locations along the travel path are associated with particular times. For instance, as shown in FIG. 3, the desired position 315 in three-dimensional space is associated with time 352, shown at 10 minutes. Further, a different desired position 315 along the travel path 310 is associated with time 354, shown at 20 minutes.

The point of origin 312 may also be referred to as a starting point or point for takeoff. At the point of origin 312, a UAV, such as the UAV 102 of FIG. 1, is positioned on the ground. Upon receiving instructions to launch and fly in accordance with the mission profile, the UAV 102 launches into the air and proceeds to fly along the travel path 310.

A first boundary 320 is shown circumscribing or encompassing the desired position 315, and the UAV 102 is shown to be flying within the first boundary 320. In the embodiment shown in FIG. 3, the first boundary 320 comprises a three-dimensional form mapped out in multi-dimensional space and circumscribing at least a portion of the travel path. The first boundary may be likened to a geofence in some embodiments. The first boundary 320 moves along the travel path 310 at one or more predetermined speeds. A second boundary 330 circumscribing the first boundary 320 also has a three-dimensional form, and is shown to encompass the entire first boundary 320. Further, planned landing zones 340 are depicted. At least some of the planned landing zones 340 comprise a contingent landing site 342. These contingent landing sites 342 are positioned on or near the ground along a distance of the travel path 310. The contingent landing sites 342 may or may not be associated with certain portions or segments of the travel path 310. In the example of FIG. 3, first boundary 320 and second boundary 330 are illustrated as spheres. However, other example three-dimensional forms are possible as well.

As mentioned above, the first boundary 320 moves along the travel path 310 at one or more predetermined speeds. In an example, the first boundary moves along the travel path 310 at the same or substantially the same speed at which the desired position 315 traverses the travel path 310. Within examples, in an event where the UAV intersects first boundary 320, the UAV may intersect the first boundary 320 by being a certain distance (e.g., a threshold amount in space) away from the desired travel path. Within other examples, the UAV may be at a particular location along the desired travel path but may be positioned at the first boundary 320 because the UAV is not at the particular position at the time associated with that particular position. Being positioned off a desired position 315 by a certain distance (e.g., a threshold amount in space) and/or time (e.g., a threshold amount in time) may be indicative of less than optimal performance of the UAV.

As mentioned above, in examples second boundary 330 encompasses the entire first boundary 320. In examples, where second boundary 330 encompasses the entire first boundary 320, the second boundary moves along the travel path 310 at one or more predetermined speeds. For instance, the second boundary 330 can move along the travel path 310 at the same or substantially the same speed at which the desired position 315 traverses the travel path 310 and at which the first boundary moves along travel path 310. In other examples, the second boundary encompasses the entire travel path (see, e.g., FIGS. 4 and 5).

In operation, the UAV 102 is instructed by a command module, such as the command module 110, to fly according to the mission profile. As the UAV 102 flies along the travel path 310, sensors which are either on-board the UAV 102 or remote from the UAV 102 track the position of the UAV 102 with respect to the first boundary 320 and the second boundary 330. The sensors may comprise any of the sensors 130 described with reference to FIG. 1. The sensors 130 then send signals comprising location information to the command module 110, which then uses the information to determine the proximity of the UAV 102 with respect to the first boundary 320 or the second boundary 330.

Should the command module 110 determine that UAV 102 is positioned at the first boundary 320 (e.g., the UAV 102 intersects the first boundary 320), the command module 110 responsively sends instructions to the UAV 102 to land at one of the plurality of contingent landing sites 342. In one example embodiment, the UAV 102 may be instructed to land at a contingent landing site 342 that is located within a certain distance of the portion of the travel path 310 through which the UAV 102 is traveling at the time of breach of the first boundary 320.

Should the command module 110 determine that UAV 102 is positioned at the second boundary 330 (e.g., the UAV 102 intersects the second boundary 330), the command module 110 responsively sends instructions to the UAV 102 to land immediately. For instance, in a situation where the UAV intersects the second boundary 330, rather than spending additional time to travel to a contingent landing site, the UAV 102 may land immediately (e.g., descend as expediently as possible and land on the ground).

In an embodiment, in response to determining that the UAV 102 is positioned at the first boundary or the second boundary, the UAV 102 may send a request to the command module 110 or a remote control system such as the remote control system 120 for input for a landing procedure. For instance, in an example, responsive to determining that the UAV 102 is positioned at the first boundary, the UAV 102 sends to the remote control system 120 a request message that requests input for executing a landing procedure. The remote control system 120 may be a ground control station that can provide input to the UAV 102 so as to assist the UAV in selecting a landing procedure. In an example, the input includes environmental input, such as input regarding obstacles in the air on the path to ground or obstacles on the ground. An example obstacle, tree 360, is shown in FIG. 3. The UAV 102 may use such environmental input to select a landing path. The input regarding obstacles in the air on the path to ground or obstacles on the ground may define avoid locations that that UAV may avoid during the landing procedure. In another example, the ground control station can provide input to assist the UAV in selecting a landing procedure by providing a landing path to the UAV.

In an example, the request received from the UAV can include an indication of target location at which the UAV 102 is targeting to land. For instance, as part of the request, the UAV 102 may indicate a target location at which the UAV 102 is targeting or attempting to land. In an example, the target location is a predetermined location at which the UAV is set to land in a contingency landing situation (such as, e.g., one of the contingent landing sites 342 shown in FIG. 3). In another example, the target location is a target location selected by the UAV so that the UAV can to land immediately.

The command module 110 or a remote control system may detect one or more obstacles on the path to ground or on the ground, and may send information regarding the obstacles to the UAV as part of the instructions to land.

FIG. 4 illustrates a mission profile 400 for the system of FIG. 1, according to an example implementation. Similar to the mission profile 300, the mission profile 400 may be generated by a user or calculated by a computing device. The mission profile 400, once generated, may be sent to a command module, such as the command module 110 of FIG. 1.

The mission profile 400 defines a travel path 410 extending from a point of origin 412 to a destination 414, and is mapped out in multidimensional space over time; in FIG. 4, the travel path 410 is set forth in three-dimensional space over minutes. A desired position 415 along the travel path 410 is shown. An example UAV, such as the UAV 102 of FIG. 1, is shown to be flying along the travel path 410. Further, planned landing zones 440 are depicted. At least some of the planned landing zones 440 comprise one or more contingent landing sites 442.

In the embodiment of FIG. 4, a first boundary 420 of the mission profile circumscribes the entire travel path 410. A second boundary 430 is shown to encompass the first boundary 420. In operation, the UAV 102 is instructed to follow the travel path 410. Should the UAV 102 veer away from the travel path 410 and intersect a portion of the first boundary 420, a command module such as the command module 110 will be notified that the UAV 102 is positioned at the first boundary 420 and will responsively send instructions to the UAV 102 to land at one of the contingent landing sites 442. Should the UAV 102 continue to fly past the first boundary 420 and intersect a portion of the second boundary 430, the command module 110 can determine that the UAV 102 is positioned at the second boundary 430 and will responsively send instructions to the UAV 102 to land immediately. For this instruction, the UAV 102 is instructed to simply descend as expediently as possible and land on the ground; the landing does not need to be within one of the planned landing zones 440.

FIG. 5 illustrates an example sequence for a first boundary as the first boundary follows a UAV executing a mission profile 500, according to an example implementation. Similar to the mission profiles 300 and 400, the mission profile 500 may be generated by a user or calculated by a computing device. The mission profile 500, once generated, may be sent to a command module, such as the command module 110 of FIG. 1.

The mission profile 500 defines a travel path 510 extending from a point of origin 512 to a destination 514, and is mapped out in multidimensional space over time. The travel path 510 is shown to be formed of a plurality of travel path segments 552, 554, 556, and 558.

A plurality of contingent landing sites 542 are positioned on the ground, within planned landing zones 540, along a distance of the travel path 510 and may each be associated with a respective segment 552, 554, 556, and 558 of the travel path 510. For instance, in an example, there may be four contingent landing sites 542, each one associated with one of segments 552, 554, 556, and 558. As illustrated in FIG. 5, each contingent landing site is illustrated as being below the travel path segment with which it is correlated. In alternative examples, there may be fewer contingent landing sites 542 than travel path segments. For instance, one contingent landing site may be associated with two or more travel path segments, for example, with both travel path segments 552 and 554, whereas another contingent landing site may be associated with both travel path segments 556 and 558.

In the embodiment shown in FIG. 5, a first boundary 520 comprises a three-dimensional form that moves along the travel path 510 at one or more predetermined speeds. The first boundary 520 changes in size and/or shape as the first boundary 520 with respect to at least some of the segments of the travel path 510. Example changes for the first boundary 520 are depicted in FIG. 5, wherein the first boundary 520 is shown to shrink in size from its position within segment 554 to its position in segment 556 and then further shrink in size at segment 558. The mission profile may define the size and shape for the first boundary 520 for various segments of a travel path. The size and shape of the first boundary 520 may change for a variety of reasons; for example, if a particular segment of the travel path extends through an airspace that has a constricted space, the first boundary may be pre-set for that segment to comprise a reduced size. Other environmental constraints may influence the size and shape of the first boundary 520 for certain segments. Further, a second boundary 530 circumscribes the first boundary 520. In the example of FIG. 5, second boundary 530 encompasses the entire travel path 510.

Figure 6:
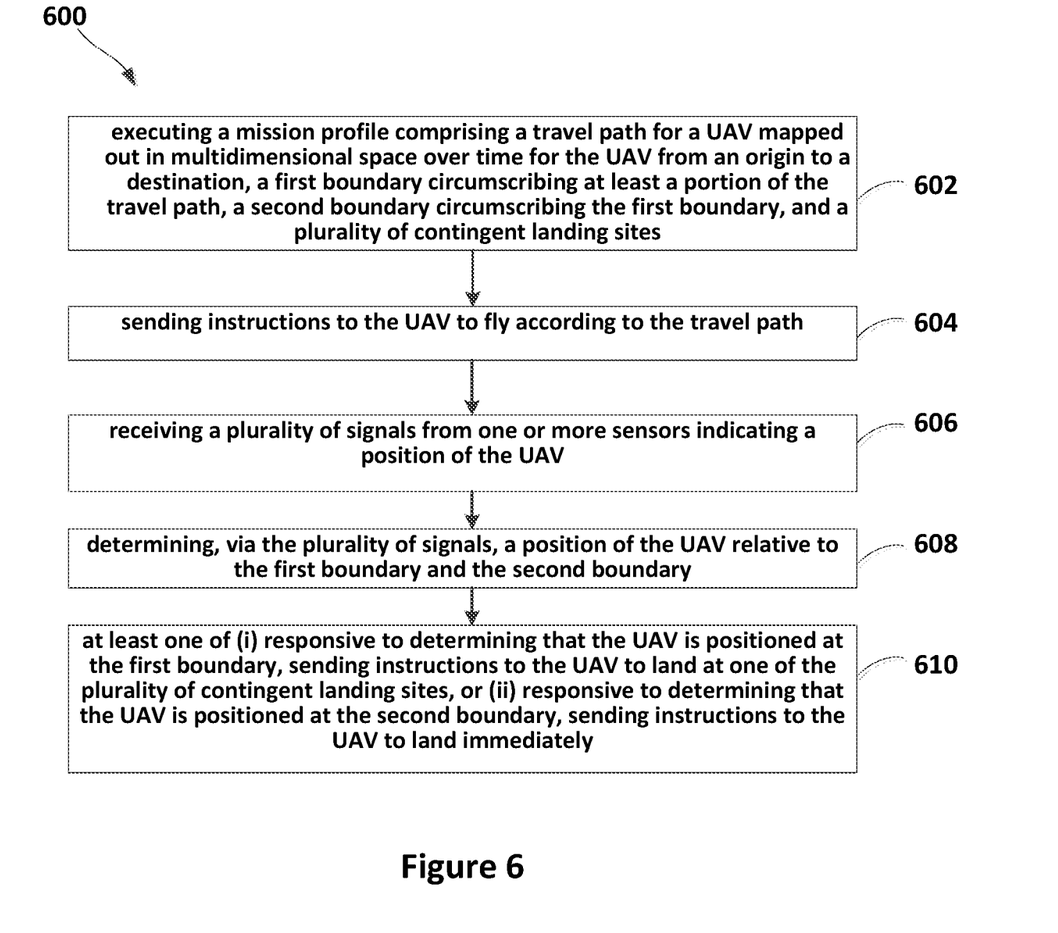
FIG. 6 illustrates a flowchart of an example of a method for contingency landing a UAV, such as the UAV of the system of FIG. 1, according to an example implementation.

FIG. 6 shows a flowchart of an example of a method 600 for contingency landing a UAV. Method 600 shown in FIG. 6 presents an example of a method that, for example, could be used with the system 100 and/or performed by the system 100 shown in FIG. 1. Method 600 includes one or more operations, functions, or actions as illustrated by one or more of blocks 602-610. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes executing a mission profile comprising a travel path for a UAV 102 mapped out in multidimensional space over time for the UAV from an origin to a destination, a first boundary circumscribing at least a portion of the travel path, a second boundary circumscribing the first boundary, and a plurality of contingent landing sites. A command module may execute the mission profile, wherein the command module 110 comprises a control unit having one or more processors configured to execute instructions stored in memory. The command module may be the command module 110 described with reference to FIGS. 1 and 2, and may be present on the UAV 102. The UAV 102 may receive the mission profile from a remote control system such as the remote control system 120 of FIG. 1. The UAV 102 may be docked at a storage location or otherwise grounded on land, and upon receiving instructions to execute a mission profile, the UAV 102 operates its propulsion unit to launch into the air at the point of origin and follows the travel path to reach the destination. The travel path is mapped in three-dimensional space over a unit of time (e.g., minutes).

The contingent landing sites may each comprise a landing surface and/or a cargo recovery system to recover any cargo attached to a UAV. In the example embodiments shown in FIGS. 3-5, a plurality of contingent landing sites 342, 442, 542 are shown.

At block 604, the method 600 includes sending instructions to the UAV to fly according to the travel path.

At block 606, the method 600 includes receiving a plurality of signals from one or more sensors indicating a position of the UAV. Sensors, such as the sensors 130 described with reference to FIG. 1, may issue the one or more signals. The sensors may be present on the UAV and send signals to a computing device, either on board the UAV or remote from the UAV, indicating location information regarding the UAV within its environment. Certain sensors may also be present remote from the UAV that can facilitate determination of the location of the UAV. For instance, in some examples, remote sensors may include one or more laser trackers at a ground station or at various ground locations.

At block 608, the method 600 includes determining, via the one or more signals, a position of the UAV 102 relative to the first boundary and the second boundary.

At block 610, the method 600 includes at least one of (i) responsive to determining that the UAV is positioned at the first boundary, sending instructions to the UAV to land at one of the predetermined contingent landing sites or (ii) responsive to determining that the UAV is positioned at the second boundary, sending instructions to the UAV to land immediately. Within examples, when the command module 110 determines that the UAV 102 is positioned at the first boundary, the method 600 includes responsive to determining that the UAV 102 is positioned at the first boundary, sending instructions to the UAV to land at one of the plurality of contingent landing sites. Whether the UAV 102 maintains position at the first boundary or proceeds to fly beyond the first boundary, the intersection of the UAV 102 with the first boundary triggers a response from the command module 110. As discussed, the command module 110 receives signals indicating position information of the UAV 102 from the one or more sensors, which will inform the command module 110 as to when the UAV 102 intersects with a portion of the first boundary. The first boundary may comprise a first boundary such as the first boundaries 320, 420, 520 described with reference to FIGS. 3-5.

Within examples, when the command module 110 determines that the UAV 102 is positioned at the second boundary, the method 600 includes responsive to determining that the UAV 102 is positioned at the second boundary, sending instructions to the UAV 102 to land immediately. Whether the UAV 102 maintains position at the second boundary or proceeds to fly beyond the second boundary, the intersection of the UAV 102 with the second boundary triggers a response from the command module 110. The signals sent from the one or more sensors will inform the command module 110 as to when the UAV 102 intersects with a portion of the second boundary. The second boundary may comprise a second boundary such as the second boundaries 330, 430, 530 described with reference to FIGS. 3-5, for example.

Figure 7:
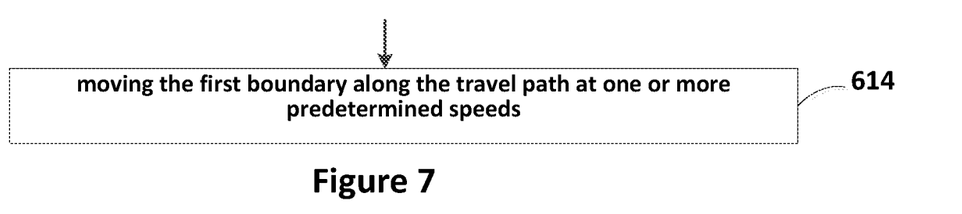
FIG. 7 illustrates another method for use with the method shown in FIG. 6, according to an example implementation.

FIG. 7 shows another method for use with the method 600 shown in FIG. 6, according to an example implementation. In FIG. 7, at block 614, the method includes moving the first boundary along the travel path at one or more predetermined speeds. The mission profile may include predetermined speeds at which the UAV is expected to travel as the UAV moves through the travel path. The mission profile would thus also include predetermined speeds at which the first boundary travels. The UAV would then be expected to be aligned with the speed of travel of the first boundary so that the UAV remains within the first boundary as both move through the travel path.

Figure 8:
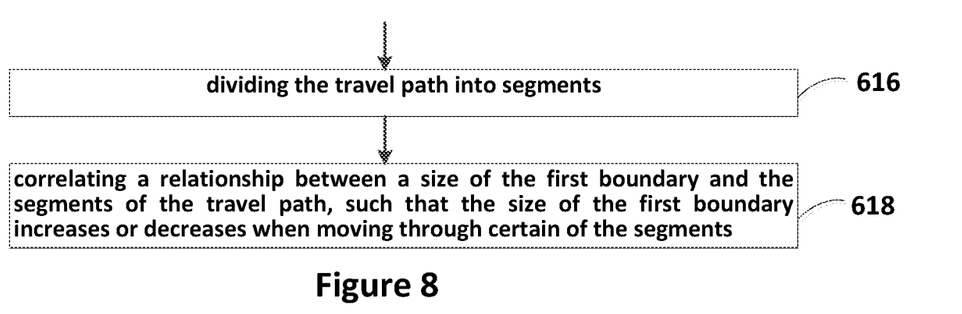
FIG. 8 illustrates another method for use with the method shown in FIG. 6, according to an example implementation.

FIG. 8 shows another method for use with the method 600 shown in FIG. 6, according to an example implementation. In FIG. 8, at block 616, the method includes dividing the travel path into segments. The travel path may thus be broken up or subdivided into segments, as described with reference to FIG. 5.

At block 618, the method includes correlating a relationship between a size of the first boundary and the segments of the travel path, such that the size of the first boundary increases or decreases when moving through certain of the segments. In other words, the first boundary changes in size with respect to at least some of the segments of the travel path. The first boundary may be predetermined to comprise a size and/or shape for each segment, such that as the first boundary transitions from one segment to the next, the size and/or shape of the first boundary correspondingly changes.

Figure 9:
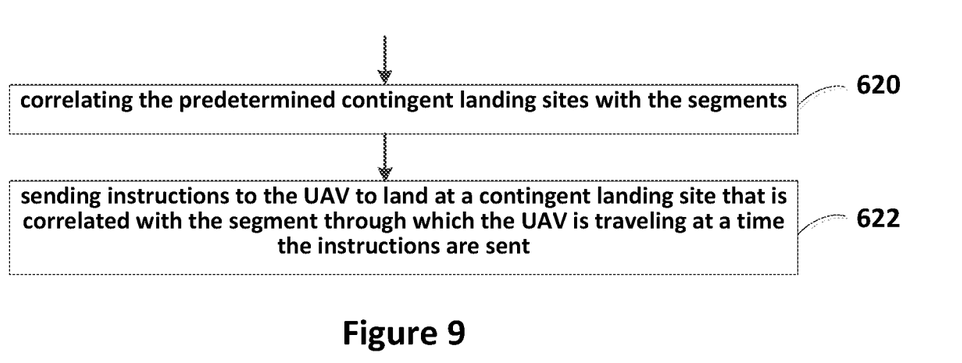
FIG. 9 illustrates another method for use with the method shown in FIG. 8, according to an example implementation.

FIG. 9 shows another method for use with the method 600 shown in FIG. 6, according to an example implementation. In FIG. 9, at block 620, the method includes correlating the predetermined contingent landing sites with the segments. For instance, as illustrated in the example of FIG. 5, each contingent landing site 542 is correlated with a respective travel path segment 552, 554, 556, and 558.

At block 622, the method includes sending instructions to the UAV to land at a contingent landing site that is correlated with the segment through which the UAV is traveling at a time the instructions are sent.

Figure 10:
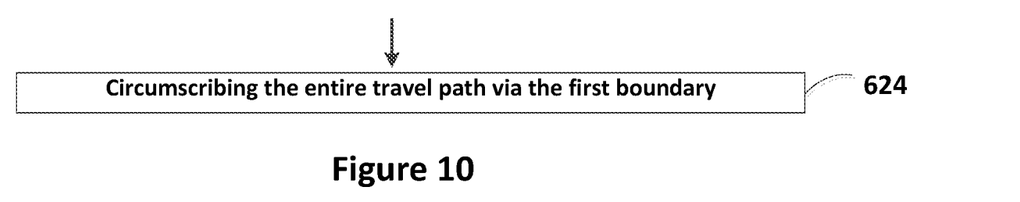
FIG. 10 illustrates another method for use with the method shown in FIG. 6, according to an example implementation.

FIG. 10 shows another method for use with the method 600 shown in FIG. 6, according to an example implementation. In FIG. 10, at block 624, the method includes circumscribing the entire travel path via the first boundary.

Within examples, the described methods and systems provide for contingent landing procedures in the event the UAV is positioned off a desired position associated with a particular time by a certain distance and/or time. Within examples, methods and system described herein can be used to execute a contingency landing for a UAV based on a multi-level boundary configuration. Such methods and systems provide for predetermined contingent landing action based on position of the UAV relative to a predefined travel path mapped out in multidimensional space over time for the UAV, a first boundary circumscribing at least a portion of the travel path, and a second boundary circumscribing the first boundary. Such methods and systems provide for increased immediacy for landing as a UAV crosses successive boundaries surrounding the travel path mapped out in multidimensional space over time.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for contingency landing an unmanned aerial vehicle (UAV) comprising:
   one or more sensors configured to detect a position of the UAV; and
   a command module comprising a control unit having one or more processors configured to execute instructions stored in memory to perform functions of:
   receiving a mission profile, the mission profile comprising a travel path mapped out in multidimensional space over time for the UAV from an origin to a destination, a plurality of first boundaries, each having a three-dimensional form and encompassing a respective different segment of the travel path, a second boundary having a three-dimensional form and encompassing an entirety of the plurality of first boundaries, and a plurality of contingent landing sites, each contingent landing site determined based on surface characteristics identified in a terrain map;
   sending instructions to the UAV to fly according to the mission profile;
   determining, via the one or more sensors, a position of the UAV relative to a desired position corresponding to the travel path and relative to the plurality of first boundaries and the second boundary, wherein the three-dimensional form of the second boundary moves along the travel path with reference to the desired position;

responsive to determining that the UAV is a threshold distance away from the desired position and intersects a portion of one of the plurality of first boundaries, sending instructions to the UAV to land at a corresponding one of the plurality of contingent landing sites; and responsive to determining that the UAV intersects a portion of the second boundary, sending instructions to the UAV to land immediately on a ground surface located below the UAV and outside the plurality of contingent landing sites.

2. The system of claim 1, wherein the one or more sensors and the command module are disposed on-board the UAV.

3. The system of claim 1, wherein the command module is remote from the UAV.

4. The system of claim 1, wherein the travel path mapped out in multidimensional space over time defines a predetermined route for the UAV to fly in multidimensional space over time.

5. The system of claim 1, wherein the plurality of contingent landing sites are positioned on ground along a distance of the travel path and are each associated with a respective segment of the travel path.

6. The system of claim 5, wherein the plurality of first boundaries move along the travel path at one or more predetermined speeds.

7. The system of claim 6, wherein the plurality of first boundaries change in size with respect to at least some of the segments of the travel path.

8. The system of claim 1, the functions further comprising:

responsive to determining that the UAV is positioned at one of the plurality of first boundaries, sending to a remote control system a request message that requests input for executing a landing procedure.

9. The system of claim 8, wherein the request message comprises an indication of a target location at which the UAV is targeting to land.

10. The system of claim 1, the functions further comprising:

responsive to determining that the UAV is positioned at the second boundary, sending to a remote control system a request message that requests input for executing a landing procedure.

11. The system of claim 1, the functions further comprising:

detecting one or more obstacles on a path to ground or on the ground, and sending information regarding the one or more obstacles to the UAV.

12. The system of claim 1, wherein at least one first boundary of the plurality of first boundaries is pre-set to be smaller than others of the plurality of first boundaries based at least in part on the at least one first boundary corresponding to a segment of the travel path that extends through an airspace having constricted space.

13. A method for contingency landing an unmanned aerial vehicle (UAV), the method comprising:

executing a mission profile, the mission profile comprising a travel path for the UAV mapped out in multidimensional space over time for the UAV from an origin to a destination, a plurality of first boundaries, each having a three-dimensional form and encompassing a respective different segment of the travel path, a second boundary having a three-dimensional form and encompassing an entirety of the plurality of first boundaries, and a plurality of predetermined contingent landing sites, each contingent landing site determined based on surface characteristics identified in a terrain map;

sending instructions to the UAV to fly according to the travel path;

receiving a plurality of signals from one or more sensors indicating a position of the UAV;

determining, via the plurality of signals, a position of the UAV relative to a desired position corresponding to the travel path and relative to the plurality of first boundaries and the second boundary, wherein the three-dimensional form of the second boundary moves along the travel path with reference to the desired position; and at least one of (i) responsive to determining that the UAV is a threshold distance away from the desired position and intersects a portion of one of the plurality of first boundaries, sending instructions to the UAV to land at a corresponding one of the predetermined contingent landing sites or (ii) responsive to determining that the UAV intersects a portion of the second boundary, sending instructions to the UAV to land immediately on a ground surface located below the UAV and outside the plurality of contingent landing sites.

14. The method of claim 13, further comprising:

moving the plurality of first boundaries along the travel path at one or more predetermined speeds.

15. The method of claim 13, further comprising:

dividing the travel path into segments; and correlating a relationship between sizes of the plurality of first boundaries and the segments of the travel path, such that the sizes of the plurality of first boundaries increase or decrease when moving through certain of the segments.

16. The method of claim 15, further comprising:

correlating the predetermined contingent landing sites with the segments; and sending instructions to the UAV to land at a contingent landing site that is correlated with the segment through which the UAV is traveling at a time the instructions are sent.

17. A command module comprising:

one or more processors configured to execute instructions stored in memory to perform functions of:

receiving a mission profile comprising a travel path for a UAV mapped out in multidimensional space over time for the UAV from an origin to a destination, a plurality of first boundaries, each having a three-dimensional form and encompassing a respective different segment of the travel path, a second boundary having a three-dimensional form and encompassing an entirety of the plurality of first boundaries, and a plurality of contingent landing sites, each contingent landing site determined based on surface characteristics identified in a terrain map;

sending instructions to the UAV to fly according to the mission profile;

determining, via signals issued from one or more sensors, a position of the UAV relative to a desired position corresponding to the travel path and relative to the plurality of first boundaries and the second boundary, wherein the three-dimensional form of the second boundary moves along the travel path with reference to the desired position;

responsive to determining that the UAV is a threshold distance away from the desired position and intersects a portion of one of the plurality of first boundaries, sending instructions to the UAV to land at a corresponding one one of the plurality of contingent landing sites; and responsive to determining that the UAV intersects a portion of the second boundary, sending instructions to the UAV to land immediately on a ground surface located below the UAV and outside the plurality of contingent landing sites.

18. The command module of claim 17, wherein the plurality of contingent landing sites are positioned on ground along a distance of the travel path and are each associated with respective segments of the travel path.

19. The command module of claim 17, wherein the command module is remote from the UAV.

20. The method of claim 13, wherein at least one first boundary of the plurality of first boundaries is pre-set to be smaller than others of the plurality of first boundaries based at least in part on the at least one first boundary corresponding to a segment of the travel path that extends through an airspace having constricted space.

* * * * *